United States Patent

[11] 3,558,983

| [72] | Inventor | Floyd L. Steen |
| | | Lansdowne, Pa. |
| [21] | Appl. No. | 738,611 |
| [22] | Filed | June 20, 1968 |
| [45] | Patented | Jan. 26, 1971 |
| [73] | Assignee | General Electric Company |
| | | a corporation of New York |

[54] CONTROLS FOR HIGH-CURRENT SOLID-STATE SWITCHES
12 Claims, 6 Drawing Figs.

[52] U.S. Cl. .................................................. 317/20,
  317/23, 317/33; 321/14; 323/24
[51] Int. Cl. ........................................................ H02h 3/08,
  H02h 7/14
[50] Field of Search ........................................... 317/23, 31,
  33SCR, 36TD, 38, 52; 321/14; 323/24

[56] References Cited
UNITED STATES PATENTS

| 3,098,949 | 7/1963 | Goldberg | 307/252X |
| 3,308,370 | 3/1967 | Britten | 307/269X |
| 3,328,606 | 6/1967 | Pinckaers | 307/239X |
| 3,350,568 | 10/1967 | Peaslee | 307/253X |
| 3,369,154 | 2/1968 | Swain | 317/33SCRX |
| 3,454,834 | 7/1969 | Giannamore | 317/31 |

Primary Examiner—James D. Trammell
Assistant Examiner—Harvey Fendelman
Attorneys—J. Wesley Haubner, Albert S. Richardson, Jr., Frank L. Neuhauser, Oscar B. Waddell, Barry A. Stein and Joseph B. Forman ABSTRACT: A solid-state AC switch (comprising inverse parallel thyristors) that "opens" in high-speed response to abnormally high currents is so controlled as to prevent automatic reclosing if (1) the overcurrent condition persists for longer than a predetermined length of time or (2) an appropriate opening command is received. For relatively high-current applications, inverse parallel sets of plural thyristors are used, and concurrent turn on of the thyristors of each set is promoted by jointly applying thereto composite firing signals comprising a component of relatively short duration and high magnitude superimposed on another component of long duration and relatively low magnitude.

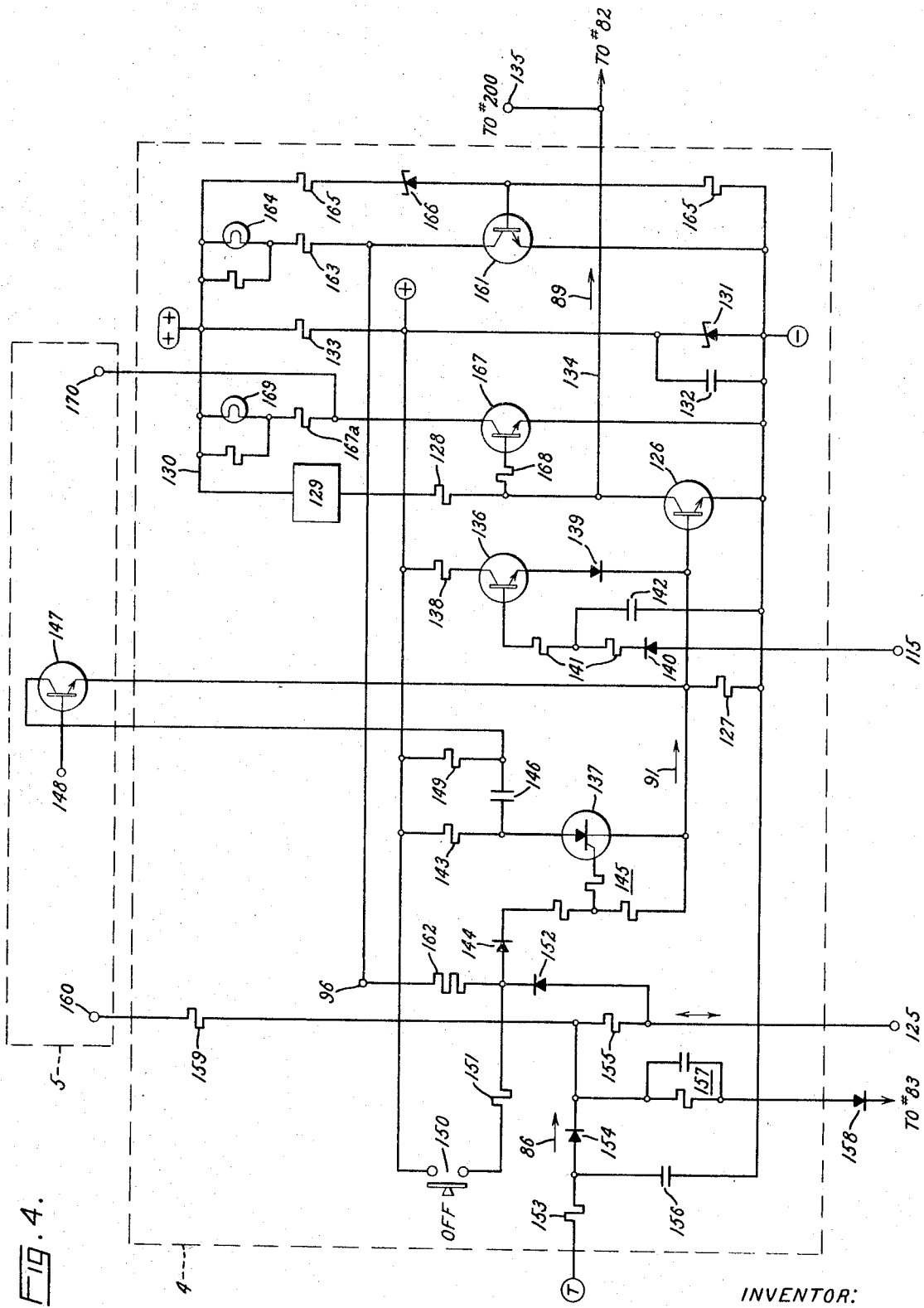

CONTROLS FOR HIGH-CURRENT SOLID-STATE SWITCHES

This invention relates to means for controlling electric power switches, and more particularly it relates to improved means for controlling overcurrent protective switches that employ high power solid-state controlled switching devices such as thyristors.

In a copending patent application Ser. No. 733,150 filed May 29, 1968 assigned to the General Electric Company, A. N. Greenwood has disclosed and claimed a unique, high-speed, multipurpose static protective means for selectively limiting current that can flow between an electric power source and a load circuit in response to a temporary overcurrent condition, and for interrupting current and completely isolating the source on command. A general objective of my invention, which in part was disclosed in the Greenwood application, is to provide improved control means for such protective means. For example, I provide means for discriminating between a temporary overload condition and an opening (turnoff) command, whereby in the latter event reclosing is prevented until the controls are deliberately reset while in the former there is an automatic return to normal.

Another objective of the present invention is to provide improved means for simultaneously turning on a plurality of thyristors in a high-current AC switch, the thyristors being arranged in two inverse parallel sets with each set comprising two or more thyristors in parallel. In carrying out this aspect of the invention, I trigger each of the parallel thyristors by a composite firing signal comprising a first component of long duration and relatively low magnitude superimposed on a second component having relatively short duration and high magnitude, the timing of the second component being synchronized with the zero crossings of alternating current traversing the switch. High-current switches equipped with this control means are useful in a variety of settings, such as, for example, the one disclosed in the above-mentioned Greenwood application.

The present invention will be better understood and its various objects and advantages will be more fully appreciated from the following description taken in conjunction with the accompanying drawings in which:

FIG. 4 is a schematic circuit diagram of a preferred embodiment of the logic means enclosed in a broken-line box 4 in FIG. 2;

Figure 1:
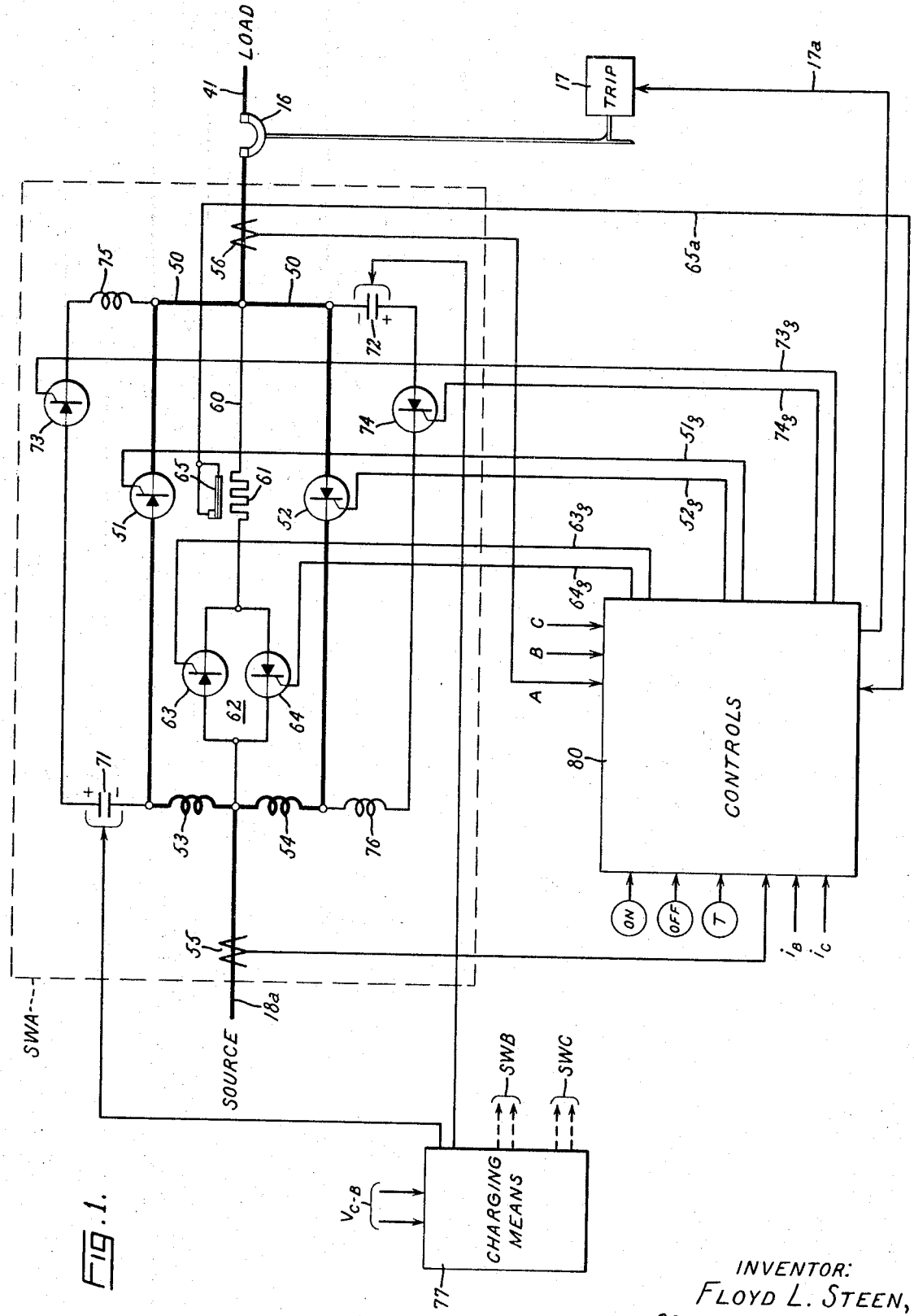
FIG. 1 is a schematic diagram of overcurrent protective means using my invention.

In FIG. 1 the power circuit of the Greenwood protective means has been shown inside a broken-line box labeled "SWA," and the associated controls are shown generally as a block 80. Details of my improved control means are disclosed in the other figures that will soon be described hereinafter.

The high-speed static switch SWA illustrated in FIG. 1 is adapted to be serially connected in a load current conducting path 41 between an electric power source and a load circuit. A slower opening electromechanical backup switch or circuit breaker 16, equipped with conventional tripping means 17, is connected in series with SWA between it and the load. In a three-phase AC system, two more duplicate static switches SWB and SWC (not shown) would be provided to form in effect a three-pole circuit interrupter, and coordinated operation of the respective switches is obtained by virtue of the common set of controls 80.

In the switch SWA there is a main circuit 50 comprising load current conducting solid-state controlled switching means, and the main circuit is shunted by a subsidiary circuit 60 comprising the combination of another switching means in series with current limiting impedance means 61. The solid-state controlled switching means of the main circuit 50 is normally maintained in a relatively low resistance, turned-on state, whereby load current can easily traverse the switch. Preferably this switching means comprises first and second semiconductor controlled rectifiers 51 and 52 disposed in inverse parallel relationship with one another as shown. Such devices are known generally as thyristors, and more information about them can be obtained from published literature such as the reference book SEMICONDUCTOR CONTROLLED RECTIFIERS by F. E. Gentry et al. (Prentice-Hall Inc., Englewood Cliffs, N.J., 1964). The main thyristors 51 and 52 are turned on (triggered) by means of firing signals supplied thereto from the associated controls 80 via connections 51g and 51g, respectively. As will be explained below in conjunction with the description of FIGS. 2 and 6, I trigger the main thyristors by means of firing signals having components synchronized with zero crossings of the alternating current in the switch SWA, and for this purpose, as is indicated in FIG. 1, the controls 80 are preferably supplied with an input signal A derived from load current by means of a current transformer 56 coupled to the path 41. (For three-phase applications, the common controls 80 additionally receive corresponding signals B and C which represent, respectively, the currents flowing through the other two poles SWB and SWC of the circuit interrupter.)

Where necessary for higher current and voltage ratings of the switch, duplicate devices can be connected in parallel and series and operated in unison with the thyristors 51 and 52, respectively. The main thyristors are selected to safely conduct their respective shares of full load current continuously. Although omitted in FIG. 1 for the sake of drawing simplicity, I specifically contemplate using two sets of two parallel main thyristors each in lieu of the thyristors 51 and 52 and proper parallel operation of each set is promoted by the novel triggering means described hereinafter.

The main circuit 50 of the switch SWA also includes a pair of decoupling inductors 53 and 54 which are respectively connected in series with the thyristors 51 and 52. The principal purpose of these inductors will soon be explained. The inductor 53 is located between the anode of thyristor 51 and the source end of the switch, and the inductor 54 is located between the cathode of thyristor 52 and the same end of the switch.

The switching means 62 in the subsidiary circuit 60 of SWA can be either an electromechanical contact or a solid-state controlled switching means which preferably exhibits bidirectionally conducting capability. As is shown in FIG. 1, it comprises a pair of thyristors 63 and 64 connected in inverse parallel relationship with one another. The on/off states of these thyristors are controlled by firing signals respectively supplied thereto from the controls 80 via connections 63g and 64g. Since the thyristors 63, 64 are in series with the current limiting impedance means 61 (preferably a resistor), and since they are not required to conduct for more than a predetermined limited length of time (see below), they can have an appreciably lower thermal rating (and hence smaller size and lower cost) than the thyristors in the main circuit 50. Preferably the resistance value of the resistor 61 is selected to limit the current that can traverse the switch, when the main thyristors 51 and 52 are both turned off and when the whole load is short-circuited, to a magnitude approximately equal to 100 percent normal full load current. A bimetallic overtemperature detector 65 disposed in the vicinity of the resistor 61 can sense cumulative overheating thereof and, via connection 65a, controls 80, and connection 17a, actuate the tripping means 17 of the backup circuit breaker 16 to remove the switch SWA from service in response thereto.

To sense the magnitude of current in the load current path 41, the illustrated switch includes a current transformer 55 which supplies a proportional input signal to the controls 80. The controls are designed to initiate an extremely fast transfer of through current from the main circuit 50 to the subsidiary circuit 60 in immediate response to the occurrence of any condition that causes abnormally high current in the main circuit, as reflected by the current transformer 55. If the resulting transfer is quick enough, the resistor 61 can impede any appreciable rise in current above the pickup level and will in fact limit current to its 100 percent value, whereby the supply apparatus (e.g., a static inverter) can continue operating without shutdown or damage and service continuity is at least temporarily preserved.

In order to accomplish this result, the switch SWA includes means, operative when commanded by the controls 80, for immediately forcing the main thyristors 51, 52 to change abruptly from their low resistance, turned-on states to high-resistance, turned-off states. Such action requires that anode current in any conducting thyristor be quenched and its firing signal be discontinued (suppressed) without waiting for the next natural current zero. To quench current in the conducting thyristors, suitable commutating means is connected to the respective sets of main thyristors 51 and 52.

The commutating means, which can take a variety of forms well known in the art, preferably comprises first and second capacitor-thyristor circuits respectively connected in parallel with the main thyristors 51 and 52 to divert current from the latter when the corresponding commutating thyristor is triggered, whereby all of the main thyristors can immediately assume a high resistance, essentially nonconducting state. Thus, as is clearly shown in FIG. 1, the series combination of a power capacitor 71, a commutating thyristor 73, and a small reactor 75 is connected across the main thyristor 51, and a similar combination of a power capacitor 72 in series with a commutating thyristor 74 and a small reactor 76 is connected across the main thyristor 52. In accordance with the teachings of U.S. Pat. No. 3,098,949 to Goldberg, each of the power capacitors 71 and 72 is precharged to a suitable DC level by suitable charging means 77 which is energized by source voltage $V_{C-B}$. (The same charging means can be used for precharging corresponding capacitors in the commutating means of the companion switches SWB and SWC.) The relative polarity of the charge on each of the capacitors 71 and 72 has been indicated on FIG. 1. To trigger the commutating thyristors 73 and 74, I supply them with concurrent firing signals via the respective connections 73g and 74g, and the inductors 53 and 54 in the main circuit 50 serve to decouple the respective commutating circuits during the time they are simultaneously turned on.

Although omitted in the drawings, it will be understood the conventional snubber circuits would ordinarily be connected in parallel with each of the thyristors shown in FIG. 1 to limit the rate of voltage rise across the thyristor when turning off.

Figure 2:
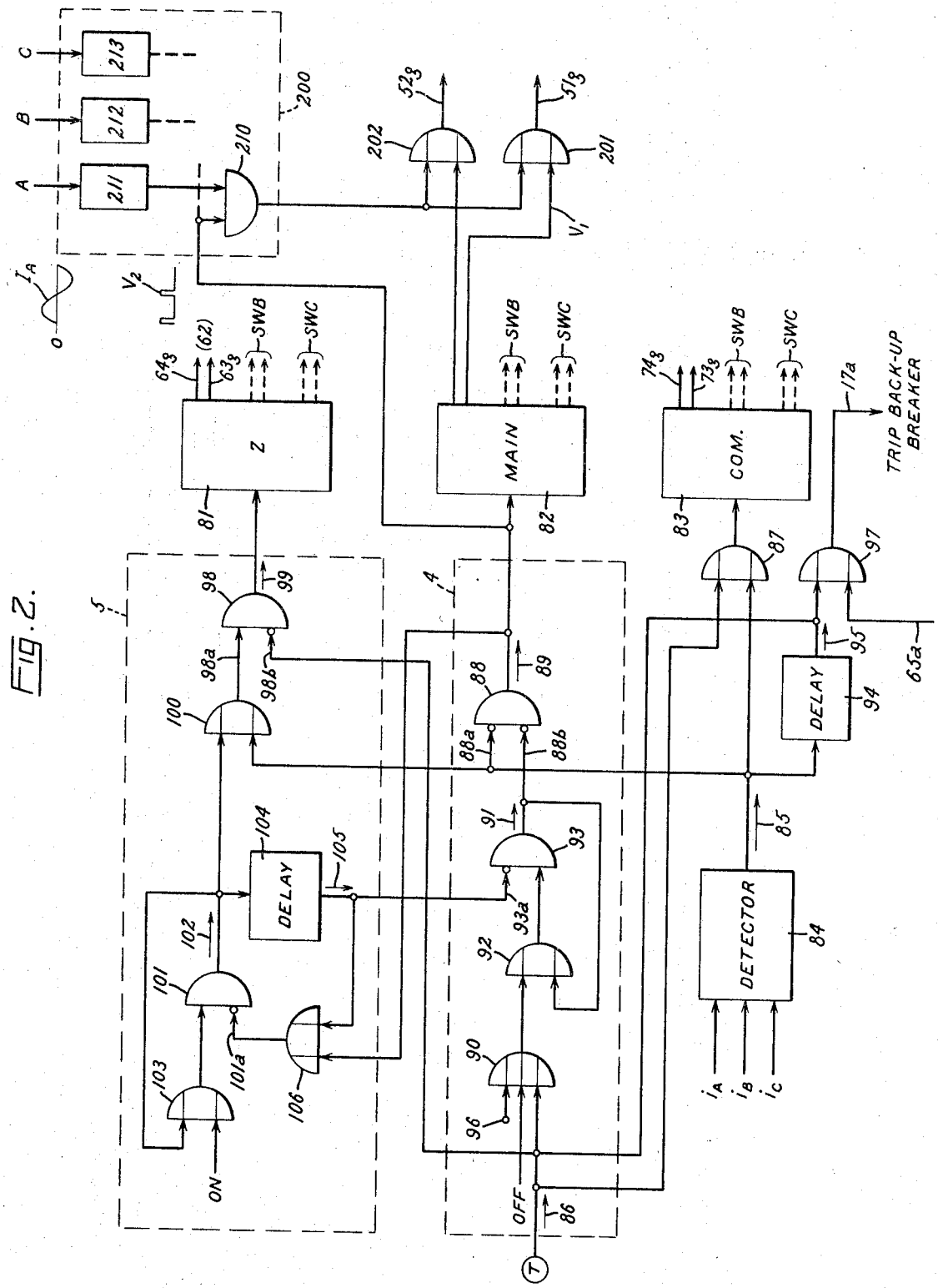
FIG. 2 is a functional block diagram of the controls shown as a signal block in FIG. 1.

Before proceeding with a description of FIG. 2, the various operating modes of the multipurpose switch SWA shown in FIG. 1 will now be summarized. Normally the thyristors 51, 52 in the main circuit 50 are turned on and alternating current freely traverses the same. The controls 80 are arranged to respond immediately to a condition of abnormally high current in the switch by supplying firing pulses to the commutating thyristors 73, 74. As a result, overcurrent is commutated from whichever main thyristor was conducting to the power capacitor in parallel therewith, and both of the main thyristors 51, 52 are quickly turned off. Substantially simultaneously the firing signals for the main thyristors are suppressed, which can be done either in automatic response to the commutating action or, as disclosed herein, by suitably programming the controls 80. At this time the switching means 62 in the subsidiary circuit is turned on, whereby the current limiting resistor 61 is effectively connected in parallel with the main circuit 50. As soon as the capacitor in the commutating circuit discharges and current through the commutating thyristor reduces to zero, the latter reverts to its high resistance, turned-off state and current, flowing through the switch, is forced to traverse the current limiting resistor 61. The time required to detect the overcurrent condition and to complete the impedance inserting action is measured in microseconds. As a result, the source apparatus (inverter) initially remains in service in the event of a load fault, thereby affording an opportunity for the faulted branch of the load circuit to be preferentially cleared by its own protective means.

The controls 80 are also arranged to suppress the abnormally signals for the switching means 62 in series with the current limiting resistor 61 and to initiate opening of the backup breaker 16 in response to the abnormally high current condition continuing for a predetermined length of time (e.g., 3 seconds), whereupon the switching means 62 turns off to interrupt current through the resistor 61, and the load circuit is completely isolated from the power source. However, if prior to the expiration of this interval the downstream protective means operates (e.g., a branch fuse blows) or the fault is otherwise selectively cleared, so that the abnormally high-current condition terminates, the switch will automatically return to its normal state. Termination of the abnormal condition is indicated by current in the load path 41 subsiding to a predetermined "dropout" value which may, for example, be 50 percent of the pickup level. This subsidence of current is sensed by current transformer 55, and the controls 80 respond thereto by restoring the firing signals for the main thyristors 51 and 52 which can then resume their normal low resistance, turned on states.

As will soon be explained in greater detail, the controls 80 are arranged simultaneously to trigger the commutating thyristor 73, 74 and to suppress the firing signals for both the main thyristors 51, 52 and the switching means 62 in high-speed response to the receipt of an externally imposed tripping signal indicated symbolically in FIG. 1 by the encircled T. Alternatively, the controls 80 will suppress the firing signals for the main thyristors 51, 52, and will not trigger any of the other thyristors in response to a predetermined "off" command.

Preferably, the controls are additionally arranged to initiate opening of the normally closed backup breaker 16 by actuating its tripping means 17, via the connection 17a, in response to either the tripping signal T or operation of the overtemperature detector 65.

In order to restart or reclose a turned-off switch SWA, the switching means 62 is first triggered, thereby inserting the resistor 61 in series with the load current path 41, and subsequently the main thyristors 51 and 52 are triggered into their conducting states. This operating sequence serves several useful purposes. While the resistor 61 is effective, it limits the magnitude of inrush current to the load circuit, thereby providing a soft start and avoiding unnecessary opening of the switch in response to only a transient overcurrent condition. The delay in triggering the main thyristors 51, 52 provides time for precharging the commutating capacitor 71 and 72, and if there is a preexisting load fault the firing signals for the main thyristors will remain suppressed.

Turning now to FIG. 2, there is shown a functional block diagram of control details embodying my invention. In FIG. 2 the blocks 81, 82, and 83, which are labeled "Z," "main," and "com," respectively, represent firing signal generators for triggering the switching means 62, the main thyristors 51, 52, and the commutating thyristors 73, 74, of the switch shown in FIG. 1. The internal circuits of the respective generators 81, 82, and 83 can be conventional (e.g., see chapters 5 and 7 of the above-cited Gentry et al. reference book), and there is therefore no need to disclose them in detail herein.

The 83 is operative to produce one short (e.g., 20 microseconds) pulselike firing signal for each of the commutating thyristors 73, 74 in SWA and in both of the companion switches SWB and SWC when it is triggered by an impedance inserting command from an overcurrent detector 84. Three input signals to the detector 84 are noted in FIG. 2 as $i_A$, $i_B$, and $i_C$, and they are respectively derived from the previously mentioned current transformer 55 and corresponding transformers in the other switches SWB and SWC. These input signals are therefore proportional in magnitude to the current actually flowing through the respective poles or phases of the circuit interrupting means. The detector 84 is designed to produce an output signal 85 in substantially instantaneous response to any input signal attaining a preset pickup level which represents a predetermined value of overcurrent in the load circuit supplied by the switch (e.g., 125 percent rated full load current). The detector 84 will then sustain its output signal 85 until load current subsequently subsides to another, lower predetermined value (e.g., 50 percent of the pickup value), whereupon the impedance inserting command terminates. The leading edge of the signal 85 triggers the firing signal generator 83.

Alternatively, the generator 83 may be activated by an opening command in the form of an externally imposed tripping signal 86. Therefore the two signals 85 and 86 are fed to the generator 83 via a conventional OR logic circuit 87. The generator 83 will produce firing signals for substantially simultaneously turning on all of the commutating thyristors 73, 74 in high-speed response to the issuance of either command. Turning on the commutating thyristors immediately commutates off whichever main thyristors 51, 52 are then conducting in any of the switches SWA, SWB, and SWC. The decoupling inductors 53 and 54 in each switch ensure successful commutation, thereby obviating the need for additional control circuitry to provide selective triggering of only those commutating thyristors associated with main thyristors that are in fact conducting when the generator 83 operates.

The main firing signal generator 82 is operative when enabled to produce a first firing signal for triggering each of the main thyristors 51 and 52 in each of the respective switches SWA, SWB, and SWC. Where two or more thyristors are operated in parallel to form each of the main sets of inverse parallel thyristors, I use first firing signals that are characterized by a relatively low magnitude but long (e.g., continuous) duration, and the first signals are augmented by relatively short duration, high magnitude second firing signals that are periodically produced in synchronism with zero crossings of switch current by means of a gate pulse generator 200. The combined firing signals are jointly applied to the respective main thyristors 51 and 52 by way of the connections 51g and 52g and suitable coupling means represented in FIG. 2 by the OR logic symbols 201 and 202. Further details and advantages of this particular control means will be explained below in conjunction with the description of FIG. 6.

Both of the generators 82 and 200 are controlled by logic means 4 so arranged that they are normally enabled, whereby all of the main thyristors 51 and 52 are normally maintained in their turned on states. The logic symbol shown at 88 represents and AND function having two NOT inputs 88a and 88b. So long as there is no signal applied to either of these units inputs, the logic component 88 will provide an output signal 89 that enables both of the generators 82 and 200 to operate. The output signal 89 is suppressed, thereby disabling these generators and consequently suppressing the firing signals for the main thyristors 51, 52, in immediate response to an input signal at either 88a or 88b. The input 88a for the logic component 88 is energized by the output signal 85 from the overcurrent detector 84, whereby the firing signals for the main thyristors are suppressed at the same time the commutating thyristors are triggered by the impedance inserting command. The generators 82 and 200 will remain disabled and the main thyristors 51, 52 will remain off so long as the signal 85 subsists.

The other input 88b for the component 88 is energized by a signal 91 that is produced whenever any one of a plurality of alternative input pulses is supplied to an OR unit 90. In accordance with my invention, once the signal 91 appears it is maintained until the controls 80 are subsequently reset by a deliberate closing command. In FIG. 2 this latching function is shown symbolically by an OR component 92 and an AND component 93. When the unit 90 receives an input pulse, the and component 94 produces the signal 91 and seals itself in until subsequently released by energization of its not input 93a.

Four possible inputs to the OR unit 90 are indicated in FIG. 2. One is derived in delayed response to the operation of the overcurrent detector 84 by means of a timing circuit 94. The timing circuit 94 is designed to produce an output signal 95 when activated continuously by the signal 85 for a predetermined length of time (e.g., 3 seconds). The delayed signal 95 causes the second disabling signal 91 to appear, after which the main generators 82 and 200 will remain disabled even though the signal 85 is discontinued. It will now be apparent that whenever the overload condition terminates before the aforesaid time interval expires, both the overcurrent detector 84 and the timing circuit 94 will immediately reset and no signal 95 will be produced, and in response to the termination of the overcurrent signal 85, the enabling signal 89 automatically returns to enable the generators 82 and 200 to resume triggering the main thyristors 51, 52. If desired, suitable means can be provided for delaying the return of the signal 89 for a certain minimum time interval to ensure ample opportunity for the charging means 77 to recharge the capacitors in the commutating circuits following any triggering of the commutating thyristors 73, 74.

Other inputs for the OR unit 90 are derived from the tripping signal 86, or from manually operated means indicated by the legend "off," or from any desired automatic inhibiting condition that results in a signal being applied to a terminal 96. One such inhibiting condition might be, for example, subnormal source voltage. The tripping signal 86 is also used to energize the connection 17a to the backup breaker 16, via appropriate amplifier and relay circuits (not shown) and OR logic circuit 97, whereby the tripping means 17 of the slower opening backup breaker is actuated when the high-speed isolating action of the static switch SWA is initiated. The normally closed backup breaker 16 is also tripped in response to either the production of delayed signal 95 by the timing circuit 94 or overheating of the current limiting resistor 61 as sensed by the overtemperature detector whose connection 65a, as indicated in FIG. 2, provides an alternative input to the OR circuit 97.

The block 81 in FIG. 2 represents suitable means for controlling the conductive state of the switching means 62 that is connected in series with the current limiting resistor 61 of the FIG. 1 switch. The means 81 is operative when active to produce an appropriate signal for turning on or closing the switching means 62 in all three switches SWA, SWB, and SWC. Where inverse parallel thyristors 63 and 64 are used, it can comprise a firing signal generator similar to the one shown at 82 for triggering the main thyristors. The generator 81 is itself controlled by logic means 5 arranged to render it normally inactive, whereby the subsidiary thyristors 63 and 64 are normally maintained in their turned-off states. This is accomplished by means of the AND logic component 98 having one regular input 98a and one NOT input 98b. Unless a signal is applied to the first input 98a and none to the second input 98b, no output signal 99 is provided by the component 98 and operation of the generator 81 is prevented or blocked.

The input 98a for the logic component 98 is energized via an OR logic circuit 100 by the output signal 85 from the overcurrent detector 84, whereby the generator 81 is activated and starts triggering the switching means 62 at the same time the commutating thyristors 73 and 74 are triggered by the impedance inserting command. Alternatively, the input 98a may be energized by a signal 102 that is produced by a logic component 101 on receipt of a switch closing command from means indicated by the legend "on." In any event, the output signal 99 of the logic component 98 is suppressed, thereby affirmatively deactivating the generator 81 and suppressing the firing signals for the switching means 62, whenever a signal is applied to its input 98b. The latter input is energized in response to issuance of an opening command corresponding to the appearance of either the output signal 95 of the timing circuit 94 (indicating that the impedance inserting command has continued to subsist for at least 3 seconds) or the tripping signal 86. When none of its thyristors is triggered, the circuit interrupter is in its open circuit condition.

To close the interrupter, a closing command is issued to the AND component 101 which immediately produces the signal 102 and latches in as is indicated symbolically at 103 in FIG. 2. The signal 102 unblocks the firing signal generator 81 which starts triggering the switching means 62 in series with the current limiting resistor 61 in the subsidiary circuits 60 of the three switches SWA, SWB, and SWC. Simultaneously it activates a timing circuit 104 which a short time later (e.g., 0.2 second) produces an output signal 105. The signal 105 energizes the NOT input 93a of the logic component 93 to release or unlatch the latter, whereupon the signal 91 terminates, the signal 89 reappears, and the main firing signal generators 82 and 200 are again enabled. This causes the main thyristors 51, 52 to turn on and "close" the low resistance main circuits 50 of the respective switches. At the same time, by means of a connection from the output of the timing circuit 104, through an OR circuit 106, to the NOT input 101a of the AND logic component 101, the signal 102 is discontinued, whereupon the generator 81 is deactivated and stops triggering the switching means 62. To ensure that the signal 102 will not coexist with the signal 89, the latter is also fed back through the OR circuit 106 to the NOT input 101a of the component 101. The advantages of the closing sequence outlined in this paragraph were previously explained.

Figure 3:
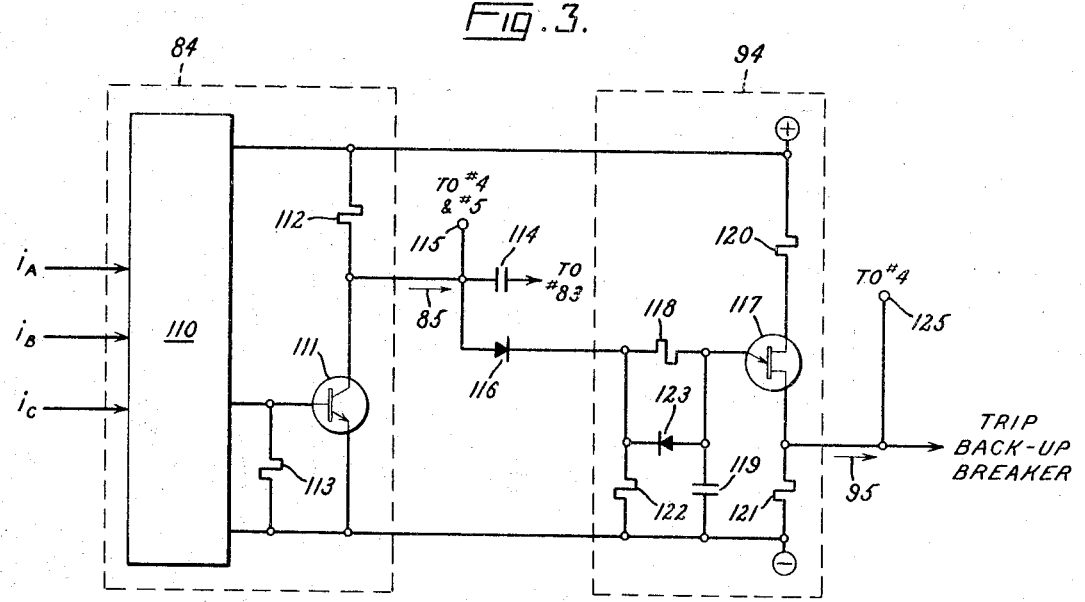
FIG. 3 is a schematic diagram of a preferred embodiment of the time delay circuit shown as a block 94 in FIG. 2.

In FIG. 3 I have shown further details of the overcurrent detector 84 and the timing circuit 94. The former comprises a level detector 110 supplied with the three input signals $i_A$, $i_B$, and $i_C$, and a transistor 111 that is maintained in a conducting state by the level detector 110 under normal conditions. The emitter of the transistor 111 is connected directly to a negative control power terminal, and the collector of this transistor is connected via a resistor 112 to a relatively positive control power terminal. (The positive and negative control power terminals, indicated in FIG. 3 by the encircled plus and minus symbols, represent a suitable control power source such as a battery.) A resistor 113 is connected between the base and the emitter of the transistor 111. The transistor 111 is normally forward biased by the level detector 110, in which state its collector is at the potential of the negative control power terminal. However, when any one of its input signals attains the preset pickup level, and for so long as it thereafter exceeds another preset dropout level, the level detector 110 withholds its forward bias of transistor 111 which consequently turns off. This unclamps the collector of the transistor 111 and enables output current to flow as indicated by the arrow 85.

The output current or signal 85 of the overcurrent detector 84 can follow several alternative paths. By way of a coupling capacitor 114 it immediately activates the firing signal generator 83 for the commutating thyristors. By way of a pin 115 it is conveyed to both the logic means 4 and the logic means 5 (see below). And by way of a diode 116 it energizes the timing circuit 94.

As is shown in FIG. 3, the timing circuit 94 comprises a unijunction transistor 117 and an R-C circuit 118—119. The two base electrodes of the unijunction transistor 117 are connected by way of base resistors 120 and 121, respectively, to the positive and negative control power terminals. The resistor 118 and capacitor 119 are serially connected between the diode 116 and the negative control power terminal, and the emitter of the unijunction transistor 117 is connected to their junction. A resistor 122 is connected in shunt with the R-C circuit, and a fast reset diode is connected across the resistor 118 as shown. With this arrangement the capacitor 119 is normally discharged and the unijunction transistor 117 is normally turned off. When the output signal 85 is produced by the overcurrent detector 84, the timing capacitor 119 begins charging, and after a predetermined length of time (e.g., 3 seconds) the voltage across the capacitor attains the peak point emitter voltage that triggers or fires the unijunction transistor 117. When the unijunction turns on, the potential of its lower base rises abruptly, and a pulselike output signal 95 is produced. This output signal activates appropriate amplifier and relay circuits for tripping the backup breaker 16, and it is coupled by means of a pin 125 to the logic means 4.

FIG. 4 shows a practical embodiment of the logic means 4 for controlling the firing signal generators for the main thyristors 51 and 52 of the static switch SWA. In this figure positive potential on the collector of a normally turned-off transistor 126 corresponds to the enabling signal 89 provided by the AND logic component 88 of FIG. 2. The transistor 126 has an emitter connected directly to the negative control power terminal and a base connected by way of a resistor 127 to the same terminal. Its collector is coupled by a resistor 128 and an indicating circuit 129 to a positive control power bus 130. In FIG. 4 the bus 130 stems from a double-plus terminal of the control power source, whereas a single-plus symbol is used to represent a control power terminal that is maintained at a somewhat lower positive potential by means of a voltage regulating diode 131 connected to the same source in parallel with a capacitor 132 and in series with a voltage dropping resistor 133 as shown.

Whenever the transistor 126 is turned on, its collector potential becomes virtually the same as that of the negative control power terminal, whereby an associated lead 134 is clamped to the negative terminal and the output signal 89 is suppressed. As previously explained, this disables both of the main firing signal generators 82 and 200 to which the lead 134 is coupled. At the same time, the circuit 129 in series with the transistor 126 is energized to reveal that the firing signals for the main thyristors have been suppressed.

The transistor 126 is turned on whenever its emitter-base junction is forward biased by the conduction of either a transistor 136 or a controlled rectifier 137. As is clearly shown in FIG. 4, the transistor 136 is connected in series with a collector resistor 138 and an emitter diode 139 between the positive control power terminal and the base of transistor 126. It is turned on only so long as there is an output signal 85 from the overcurrent detector 84, which signal energizes the base of transistor 136 via the pin 115, an isolating diode 140, and a pair of resistors 141 the junction of which is coupled to the negative control power terminal by a small noise suppressing capacitor 142.

The controlled rectifier 137 shown in FIG. 4 corresponds to the latching means 92, 93 of FIG. 2. Its anode-cathode circuit is connected in series with a resistor 143 between the positive control power terminal and the base of transistor 126. When triggered by an appropriate current pulse supplied to its gate via a diode 144 and a resistor network 145, the controlled rectifier 137 switches to a conducting state and its anode current 91 turns on the disabling transistor 126, whereupon its gate loses control and the rectifier 137 remains on until subsequently "released" by the action of an associated commutating circuit comprising a capacitor 146 and a normally turned-off transistor 147. The transistor 147 is located in the logic means 5 which will be described in more detail below. When its base terminal 148 is energized, transistor 147 turns on and provides a low-impedance path for discharging the commutating capacitor 146 (previously charged through a resistor 149 and the conducting rectifier 137), thereby turning off the controlled rectifier 137.

Signals for triggering the controlled rectifier 137 can be supplied to its gate via the diode 144 from a number of alternative inputs. One is derived from the control power by manually operating a push button 150 which, as can be seen in FIG. 4, is connected in series with a resistor 151 between the positive control power terminal and the anode of diode 144. Another comprises the delayed signal 95 produced by the timing circuit 94 shown in FIG. 3 and conveyed to the diode 144 via the pin 125 and an isolating diode 152. A third input to the diode 144 comprises the tripping signal 86 which is received from the external source T. In FIG. 4, the source T is shown connected to the diode 144 by way of a resistor 153, an isolating diode 154, a resistor 155, and the diode 152, with a noise suppressing capacitor 156 being connected between the resistor 153 and the negative supply voltage terminal.

As was previously explained, the tripping signal 86 is intended to perform other functions in addition to producing the disabling signal 91 by triggering the controlled rectifier 137.

Its leading edge turns on the commutating thyristors in the switch SWA, for which purpose it is fed to the firing signal generator 83 by means of a parallel R-C circuit 157 and an isolating diode 158; it actuates the tripping means 17 of the electromechanical backup breaker 16 to which it is conveyed via the pin 125; and by way of a resistor 159, a pin 160, and the logic means 5, it affirmatively deactivates the firing signal generator 81 for the thyristors 63, 64 in the subsidiary circuit 60 of the switch SWA.

Yet another input to the gating circuit of the controlled rectifier 137 shown in FIG. 4 comprises under voltage responsive means which causes the switch SWA to turn off if control power is failing. This undervoltage responsive means comprises a normally turned-on transistor 161 whose emitter is connected directly to the negative control power terminal and whose collector is connected by way of the terminal 96 and a resistor 162 to the anode of the diode 144. The collector of the transistor 161 is also connected to the positive control power bus 130 via a resistor 163 and an indicating lamp 164. To maintain the transistor 161 normally conducting, its base is connected to the junction of a resistor 165 and a Zener diode 166 which, in series with another resistor 165, are connected between the bus 130 and the negative control power terminal. The Zener diode 166 will stop conducting if the potential level on the positive bus 130 should fall below its breakdown level, in which event the transistor 161 turns off and a positive-going signal is applied to the terminal 96.

Whenever either the transistor 136 or the control rectifier 137 is activated, the normally off transistor 126 in the logic means 4 is turned on, thereby clamping the lead 134 to the negative control power terminal and consequently suppressing both of the main firing signal generators 82 and 200. When the transistor 126 turns on, it also turns off a normally turned on transistor 167 whose base-emitter junction is connected in series with a base resistor 168 between the lead 134 and the negative control power terminal. The collector of the transistor 167 is connected to the positive control power bus 130 by way of a resistor 167a and an indicating lamp 169, and it is also connected to the logic means 5 via a pin 170.

Figure 5:
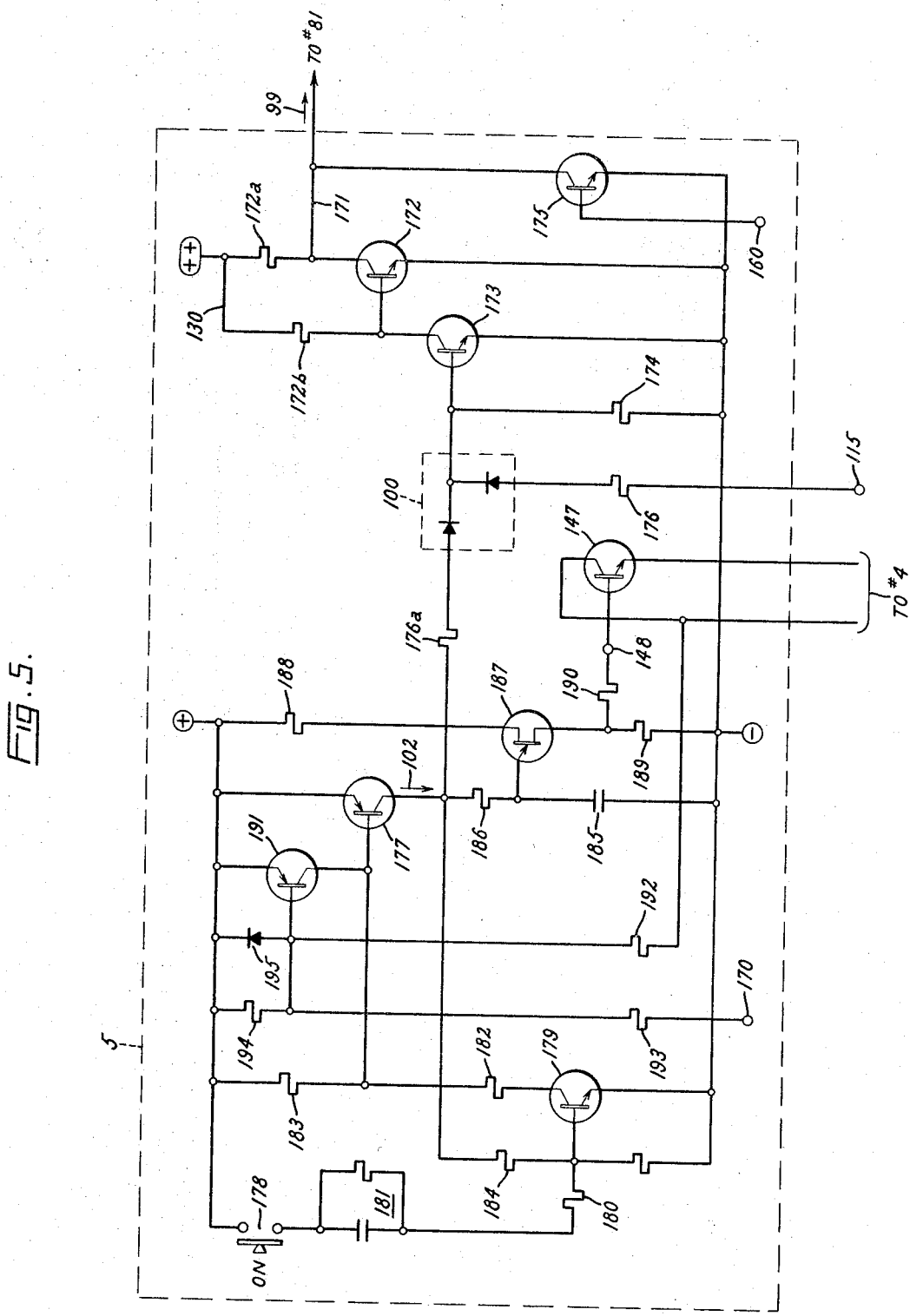
FIG. 5 is a schematic circuit diagram of a preferred embodiment of the logic means enclosed in a broken-line box 5 in FIG. 2.

FIG. 5 shows a practical embodiment of the logic means 5 for controlling the firing signal generator 81 associated with the subsidiary thyristors 63 and 64 of the static switch SWA. In this figure positive potential on a lead 171 corresponds to the activating signal 99 provided by the AND logic component 98 of FIG. 2. The lead 171 is normally clamped to the negative control power terminal, whereby the output signal 99 is suppressed and the generator 81 is inactive, by means of a normally conducting transistor 172 connected therebetween. The collector of transistor 172 is connected directly to the lead 171 and by means of a resistor 172a to the positive control power bus 130. The base of this normally turned-on transistor is coupled by a resistor 172b to the positive control power bus 130, and it is connected to the negative control power terminal by a normally off transistor 173 whose emitter-base junction is shunted by a resistor 174.

Whenever the emitter-base junction of the transistor 173 is energized by a forward bias signal, this transistor will turn on and thereby cause the transistor 172 to turn off, whereupon the activating signal 99 is produced if the lead 171 is not clamped to the negative control power terminal by the operation of another transistor 175 connected in parallel with the transistor 172. The transistor 175 is turned on, thereby suppressing the signal 99 and affirmatively deactivating the generator 81 regardless of the state of transistor 173, whenever the pin 160 to which its base is connected is energized. This happens in response to receipt of a tripping signal 86 via the diode 154 and the resistor 159 (see FIG. 4), or in response to receipt of the delayed signal 95 via pin 125, resistor 155, and resistor 159.

The conducting state of the transistor 173, and hence activation of the generator 81, depends on a forward bias signal being received from the OR logic circuit 100 which in FIG. 5 is shown as two diodes connected in common to the base of transistor 173. One of these diodes is coupled by a resistor 176 to the pin 115, and it conducts a forward bias signal to 173 only so long as the previously described overcurrent detector 84 is supplying an output signal 85 to the pin 115. The other diode in the circuit 100 is connected through a resistor 176a and a normally turned off transistor 177 to the positive control power terminal, and therefore and alternative forward bias signal is applied to the transistor 173 whenever the transistor 177 is turned on.

The transistor 177 is turned on on receipt of the switch closing command. In FIG. 5 the closing command comprises manual operation of a pushbutton 178 which connects the base of a transistor 179 to the positive control power terminal via a resistor 180 and a parallel R-C circuit 181. The emitter of transistor 179 is connected directly to the negative control power terminal, and its collector is connected through two resistors 182 and 183 to the positive control power terminal. The base of the transistor 177 is connected to the junction of resistors 182 and 183, and therefore the transistor 177 is turned on when the transistor 179 turns on in response to closing the pushbutton 178. By means of a feedback resistor 184 that interconnects the collector of transistor 177 and the base of transistor 179, this combination seals in once activated. When the transistor 177 is turned on, its collector current corresponds to the signal 102 produced by the logic component 101 of FIG. 2.

When the transistor 177 turns on and its collector current 102 begins to flow, it activates activates not only the transistor 173 but also a timing circuit 104 which in FIG. 5 is illustrated as a capacitor 185 connected in series with a resistor 186 between the collector of transistor 177 and the negative control power terminal. In a short time (e.g., 0.2 second) the capacitor 185 will charge to a level that triggers a unijunction transistor 187 connected thereto. The unijunction transistor 187 has upper and lower base resistors 188 and 189 as shown, and its emitter is connected to the junction of capacitor 185 and resistor 186. Its lower base electrode is coupled by a resistor 190 to the base terminal 148 of the transistor 147. The base terminal 148 is energized when the unijunction transistor 187 is triggered in delayed response to the signal 102, whereupon the transistor 147 turns on and releases the controlled rectifier 137 in the FIG. 4 logic means. The effect of releasing 137 is to terminate the forward bias signal 91 for the previously described transistor 126, whereby transistor 126 turns off, the generators 82 and 200 are enabled, and the main thyristors 51, 52 are permitted to resume their turned-on states. At the same time, transistor 191 in FIG. 5 is turned on, thereby releasing or unlatching the combination of transistors 177 and 179.

As is clearly shown in FIG. 5, the transistor 191 connects the base of transistor 177 to the positive control power terminal, and whenever the former is turned on, the latter cannot conduct. When the transistor 177 is turned off in this manner, the transistor 179 also turns off and the combination is reset. Consequently the signal 102 is discontinued, the transistor 173 turns off, and the transistor 172 returns to its normally conducting state in which it suppresses the activating signal 99 for the firing signal generator 81. This resetting action is initiated by turning on the transistor 191 whose base is coupled by a resistor 192 to the collector of transistor 147. Thus the transistor 191 is turned on when the transistor 147 turns on to enable the logic means 4. The base of transistor 191 is alternatively coupled by a resistor 193 to the pin 170, and consequently this transistor is forward biased (and the transistor 177 remains off) while the transistor 167 in logic means 4 is conducting, a condition that will persist so long as there is an enabling signal 89 for the main firing signal generators 82 and 200. As can be seen in FIG. 5, the emitter and the base of transistor 191 are interconnected by the parallel combination of a resistor 194 and a diode 195.

Figure 6:
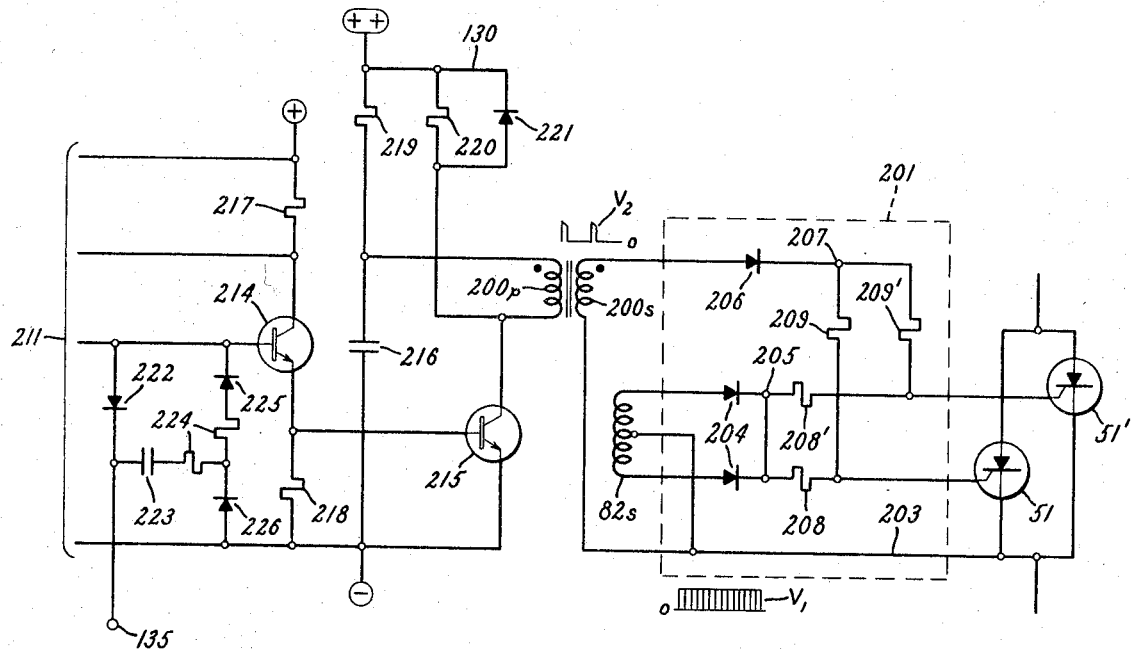
FIG. 6 is a schematic circuit diagram of my improved triggering means shown functionally in FIG. 2.

With reference now to FIG. 6, I will describe in greater detail my improved means for triggering parallel main thyristors in a high-current version of an AC static switch such as SWA. FIG. 6 illustrates one set or cluster of parallel, unidirectionally conducting thyristors 51 and 51' which, in parallel with a similar but inversely poled set, is intended to be serially connected in an alternating current circuit. It is an old practice in the art to parallel high-power thyristors in this manner and to promote equal sharing of load current by carefully grading and selecting the respective thyristors of each set so that they have closely matching forward conducting characteristics. However, successfully turning on the paralleled thyristors at the beginning of each of their periodic conducting intervals presents an additional problem that has been difficult to solve, particularly in AC switches where the forward anode-to-cathode voltage impressed upon the set of parallel thyristors at the moment of triggering can be nearly zero. If all of the thyristors do not simultaneously commence conducting when triggered at the start of a half cycle of load current, the first one to turn on may so depress the anode voltage on the remainder that the slower thyristor fails to turn on at all. Contributing to this problem is the difficulty and expense of precisely matching both the transient turn on (forward switching) characteristics and the steady-state conducting characteristics of two or more high current thyristors of popular design.

It has heretofore been recognized that the chances of simultaneously turning on paralleled thyristors can be improved by applying to their respective gates simultaneous firing pulses having very steep, high wave fronts. It has also been recognized that in some cases an initial failure to turn on all of the thyristors of the set can be corrected or accommodated by using maintained firing signals. In the present patent application a new control means embodying a unique combination of both of these techniques is disclosed. In accordance with this aspect of my invention, overdriving firing pulses synchronized with zero crossings of load current are periodically produced by the main generator 200 and are superimposed on a maintained firing signal of relatively low magnitude produced by the companion main generator 82.

FIG. 6 illustrates a preferred embodiment of means for accomplishing this result. In this FIG. the reference character 82s identifies one of the secondary windings of an output transformer in the first firing signal generator 82. The winding 82s has a center tap connected to a cathode lead 203, and its opposite ends are connected through diodes 204 to a common point 205. Whenever the generator 82 is enabled by the output signal 89 of the logic means 4, it will produce at 82s a high-frequency square-wave voltage which, after rectification by the diode 204, energizes the point 205 with an essentially continuous unipolarity voltage $V_1$ of relatively low magnitude (e.g., 10 volts, measured from the lead 203).

As is shown in FIG. 6, the reference character 200s identifies a secondary winding of one of the output transformers in the gate pulse generator 200. The no dot end of this winding is connected to the cathode lead 203, and the other end is connected through a diode 206 to a point 207 in the coupling means 201. The generator 200 is arranged, when enabled by the previously mentioned signal 89, to produce at the point 207 a train of voltage pulses $V_2$ each of which has relatively short duration (e.g., 160 microseconds) and high magnitude (e.g., 20 volts, measured from the lead 203). In a manner soon to be described, the $V_2$ voltage pulses are synchronized with zero crossings of alternating current in the circuit that includes the main thyristors 51 and 51'.

As can be seen in FIG. 6, both of the points 205 and 207 are coupled to each gate of the respective thyristors 51, 51' by means of a network of current limiting resistors 208, 208' and 209, 209', and the cathode lead 203 is connected to the cathodes of the same thyristors. In this manner the signals $V_1$ and $V_2$ are jointly applied to each thyristor. By appropriately selecting and proportioning the resistance values of 208 and 209 in relation to the magnitudes of $V_1$ and $V_2$ and the gate-cathode characteristics of the thyristors, I ensure that both signals, while they coexist, contribute gate current to each thyristor, whereby the gates of both thyristors are overdriven for the initial portion of each conducting half cycle when anode voltage and current are relatively low. By the time the second signal $V_2$ expires, anode current will have attained an appreciable magnitude, and throughout the remainder of that conducting half cycle successful parallel operation is assured by the first firing signal which effects lower values of holding current than could otherwise be realized.

It will be understood that the details of the coupling means 202 shown in FIG. 2 are similar to those of 201 just described, with the first and second firing signals $V_1$ and $V_2$ for the companion set of parallel main thyristors 52, 52' being simultaneously generated by the same transformer secondary windings 82s and 200s or by duplicate windings respectively associated therewith.

FIG. 6 also shows a preferred form of part of the gate pulse generator 200. In this FIG. the combination of transistors 214 and 215, a capacitor 216, and a primary winding 200p of the output transformer are used to generate the train of gate pulses $V_2$. This combination corresponds in effect to the AND logic component 210 shown symbolically in FIG. 2. The complete generator 200 includes a total of three such combinations, one for each of the switches SWA, SWB, and SWC. These combinations are respectively governed by synchronizing means 211, 212, and 213, which in turn are energized by the input signal A, B, and C derived from the different phase currents traversing the respective switches. As is indicated in FIG. 2 for a full cycle of the first phase, the synchronizing means 211 receives an input signal A representing sinusoidal alternating current $I_A$ in the switch SWA, and each time $I_A$ crosses zero it causes 210 to produce a short gate pulse $V_2$ for the main thyristors of the corresponding switch. Any suitable polarity sensing means can be used for this purpose.

As can be seen in FIG. 6, the synchronizing means 211 is coupled to the transistor 214 which is connected between positive and negative control power terminals in series with a collector resistor 217 and an emitter resistor 218, respectively. The synchronizing means 211 is arranged to apply a forward bias signal to the base of transistor 214 for a short length of time following each zero crossing of the alternating current $I_A$ tranversing the switch SWA. While the transistor 214 is conducting in response to this forward bias, the companion transistor 215 is turned on.

As is shown in FIG. 6, the transistor 215 is connected in series with the transformer primary winding 200p across the capacitor 216, and its emitter-base junction is connected across the resistor 218. The capacitor 216 discharges through the winding 200p to produce a gate pulse $V_2$ each time the transistor 215 turns on. Between successive gate pulses the capacitor 216 is recharged from the positive control power bus 130 to which it is connected via a resistor 219, and the core of the output transformer is reset by current flowing from the bus 130 through a resistor 220, into the no dot end of primary winding 200p, and through the charging capacitor 216. The resistor 220 is shunted by a diode 221 as shown.

The above-described operation of the gate pulse generator 200 can continue only so long as enabled by the logic means 4. If and when the enabling signal 89 is suppressed, the periodic forward bias signal for the transistor 214 is clamped to the negative control power terminal via a diode 222, the pin 135, and the turned-on transistor 126 in FIG. 4, whereby the transistor 214 cannot turn on. As is clearly shown in FIG. 6, the diode 222 is shunted by a circuit comprising, in series, a capacitor 223, a pair of resistors 224, and an inversely poled diode 225, with another diode 226 being connected between the junction of the resistors 224 and the negative control power terminal. The purpose of this circuit is to cause the transistor 214 to turn on in response to a positive-going potential at pin 135 which occurs when the transistor 126 stops conducting and the enabling signal 89 returns, whereby the generator 200 will generate an initial gate pulse $V_2$ at whatever moment of time the logic means 4 happens to change from its disabled state to its enabled state. This ensures concurrent turn on of the paralleled thyristors 51 and 51' even if the enabling signal first appears between zero crossings of load current or when there was no prior current in the load circuit.

While the presently preferred form of my invention has been shown and described by way of illustration, many modifications will no doubt occur to those skilled in the art. I therefore contemplate by the claims which conclude this specification to cover all such modifications as fall within the true spirit and scope of my invention.

I claim:
1. In combination:
 a. a main circuit comprising solid-state controlled switching means which is normally maintained in a relatively low resistance state whereby electric current can easily traverse said main circuit;
 b. said main circuit being shunted by the combination of another switching means in series with current limiting impedance means;
 c. first means for serially connecting said main circuit in a load current conducting path between a source of electric power and an electric power load circuit;
 d. second means operative in immediate response to a condition of abnormally high current in said path for causing said controlled switching means to change from its low resistance, turned on state to a high resistance, turned-off state, whereupon current is forced to traverse said impedance means;
 e. third means operative in delayed response to said abnormally high current condition for causing said other switching means to turn off, thereby interrupting current through said impedance means, unless said abnormal condition has earlier terminated, said second means being arranged automatically to return said controlled switching means to its low resistance state in response to the termination of said abnormal condition before operation of said third means;
 f. latching means responsive to operation of said third means for preventing said second means from returning said controlled switching means to its low resistance state; and
 g. means for subsequently releasing said latching means.

2. In combination:
 a. a main circuit comprising solid-state controlled switching means which is normally maintained in a relatively low resistance, turned-on state whereby electric current can easily traverse said main circuit;
 b. said main circuit being shunted by the combination of another switching means in series with current limiting impedance means;
 c. means for serially connecting said main circuit in a load current conducting path between a source of electric power and an electric power load circuit;
 d. means operative in response to a first command for causing said controlled switching means to change from its turned-on state to a high resistance, turned-off state, whereupon current is forced to traverse said impedance means;
 e. means operative in response to a second command issued after said first command for causing said other switching means to turn off, thereby interrupting current through said impedance means;
 f. latching means responsive to said second command for preventing said controlled switching means from resuming its turned on state; and
 g. means for subsequently releasing said latching means.

3. The combination of claim 2 in which said other switching means comprises additional solid-state controlled switching means, and in which a normally closed electromechanical switch is connected in said load current conducting path in series with said main circuit, said electromechanical switch being arranged to open in response to said second command.

4. In combination:
 a. a main circuit comprising first solid-state controlled switching means;
 b. normally enabled first control means for triggering said first switching means which consequently can assume a relatively low resistance, turned-on state whereby electric current can easily traverse said main circuit, said first control means being disabled in response to either a first command or a second command;
 c. said main circuit being shunted by the combination of second solid-state controlled switching means in series with current-limiting impedance means;
 d. normally inactive second control means operative when activated for triggering said second switching means which consequently can assume a relatively low resistance, turned-on state, thereby effectively connecting said impedance means in parallel with said main circuit, said second control means being activated in response to said first command;
 e. means for serially connecting said main circuit in a load current conducting path between a source of electric power and an electric power load circuit; and
 f. latching means responsive to said second command for maintaining said first control means disabled until said latching means is subsequently released.

5. The combination set forth in claim 4 including commutating means operative in response to said first command for quenching current in said first switching means which will consequently change abruptly from its turned-on state to a high resistance, turned-off state.

6. The combination set forth in claim 5 in which said commutating means is also operative in response to said second command, and means is provided for preventing activation of said second control means in response to said second command.

7. Electric current limiting protective means comprising:
 a. a main circuit comprising at least first and second thyristors disposed in inverse parallel relationship with one another, and a pair of inductors respectively connected in series with said first and second thyristors;
 b. said main circuit being shunted by the combination of bidirectionally conductive solid-state controlled switching means in series with current-limiting impedance means;
 c. means for serially connecting said main circuit in an alternating current conducting path between a source of AC electric power and an AC load circuit;
 d. normally enabled firing signal generating means for maintaining both of said thyristors continuously turned on;
 e. first and second commutating means respectively connected to said thyristors and operative when triggered to quench any current then flowing in the associated thyristor, said first and second commutating means being decoupled by said inductors; and
 f. means responsive to a condition of abnormally high current in said path for substantially simultaneously triggering both of said commutating means and disabling said firing signal generating means, whereupon said thyristors turn off and current is forced to traverse said impedance means.

8. Electric current switching means comprising:
 a. a first set of at least two parallel, unidirectionally conducting thyristors;
 b. a second set of at least two parallel, unidirectionally conducting thyristors;
 c. means for connecting said first and second sets of thyristors in inverse parallel relationship with one another in a circuit adapted to conduct alternating current;
 d. control means operative when enabled for maintaining all of said thyristors turned on comprising:
  i. first means for generating a first firing signal of long duration and relatively low magnitude;
  ii. second means for generating a train of second firing signals each having relatively short duration and high magnitude;

iii. means for synchronizing the second firing signals with zero crossings of the alternating current in said circuit; and iv. coupling means for jointly applying said first and second firing signals to each of the thyristors in said first set; and e. means for selectively enabling and disabling said control means.

9. The switching means of claim 8 in which said first means is arranged simultaneously to generate first firing signals for the respective sets of thyristors, said second means is arranged simultaneously to generate trains of second firing signals for the respective sets of thyristors, and said coupling means is arranged to jointly apply the first and second firing signals for said second set to each of the thyristors in that set at the same time it jointly applies first and second firing signals to each thyristor in said first set.

10. The switching means of claim 8 in which said second means is arranged to generate an initial second firing signal at the moment of time when said control means is changed from a disabled state to an enabled state.

11. The switching means of claim 10 in which the paralleled sets of thyristors are shunted by the combination of a current limiting resistor in series with another switching means which is turned on before enabling said control means.

12. The switching means of claim 8 in which the duration of said first firing signal is at least as long as any conducting interval of said first set of thyristors.